Nov. 29, 1960

F. O. LUENBERGER 2,961,716

METHOD OF SEALING THE BORE OF A STATOR STRUCTURE
BY EXTRUDING A LINER AND SUBJECTING THE LINER
TO CENTRIFUGAL FORCE WHILE CURING

Filed July 5, 1955

INVENTOR.
FREDERICK O. LUENBERGER
BY
Flam and Flam
ATTORNEYS.

Nov. 29, 1960 F. O. LUENBERGER 2,961,716
METHOD OF SEALING THE BORE OF A STATOR STRUCTURE
BY EXTRUDING A LINER AND SUBJECTING THE LINER
TO CENTRIFUGAL FORCE WHILE CURING
Filed July 5, 1955 2 Sheets-Sheet 2
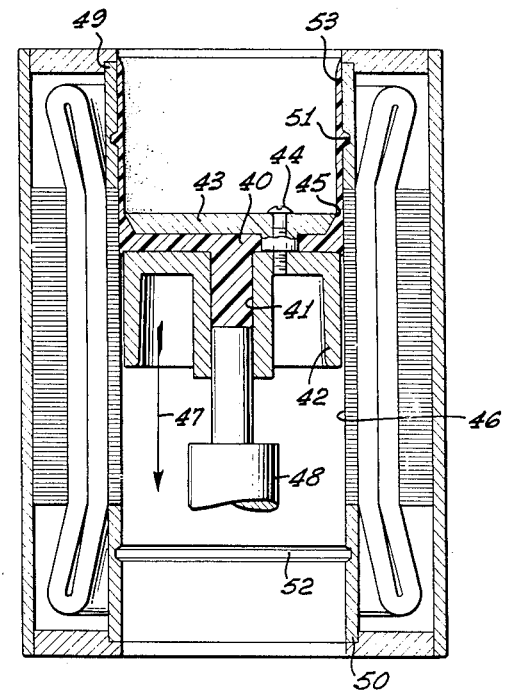
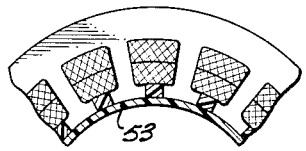
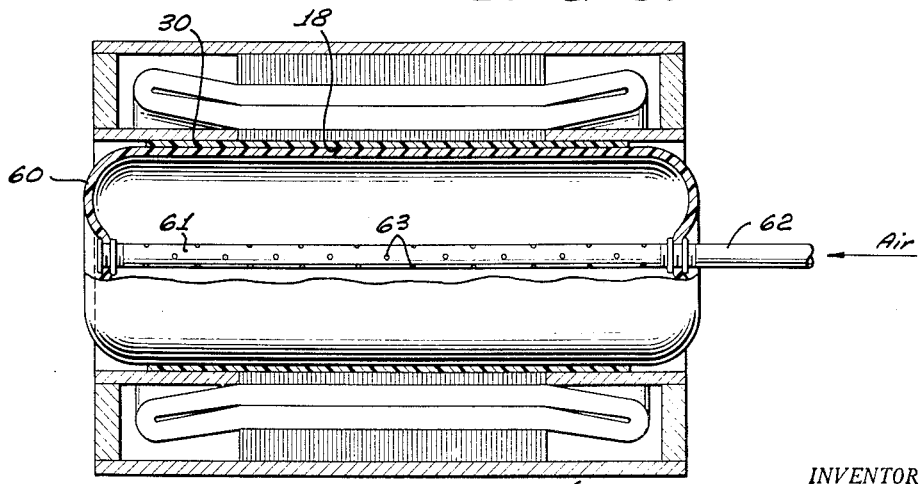
INVENTOR.
FREDERICK O. LUENBERGER
BY
ATTORNEYS.

United States Patent Office 2,961,716
Patented Nov. 29, 1960

2,961,716

METHOD OF SEALING THE BORE OF A STATOR STRUCTURE BY EXTRUDING A LINER AND SUBJECTING THE LINER TO CENTRIFUGAL FORCE WHILE CURING

Frederick O. Luenberger, Los Angeles, Calif., assignor to U.S. Electrical Motors, Inc., Los Angeles, Calif., a corporation of California Filed July 5, 1955, Ser. No. 519,762

2 Claims. (Cl. 18—59)

The invention relates to sealing methods for windings of dynamoelectric machines, and particularly to methods of making a submersible motor utilizing a liner for the stator bore.

Liners for enclosing the stator windings have been heretofore used to protect them against the entry of water or other fluids. In addition to the essential property of being able to prevent transmission of fluid, the liner desirably should be of nonmagnetic and nonconductive material in order not to detract from the efficient operation of the motor. It should also be of high tensile strength. In the past, metal liners have been provided; in some instances, special provisions were made to reduce the quantity of metal without impairing either the strength of the liner or its sealing properties.

Polyester resins have properites attractive for use as a stator bore liner; however, a considerable problem exists as to how the plastic can be properly bonded to the metal parts in the relatively inaccessible stator bore.

The primary object of this invention is to provide a satisfactory way to affix a plastic liner to the stator bore.

In one form of the invention, polyester resin in sheet form is coated on one side with a suitable adhesive and convoluted in the stator bore, and an eccentric mandrel is placed in the bore to urge the polyester resin in place, the direction of rotation of the mandrel corresponding to unwinding or expansion of the convolutions.

In another form of the invention, the polyester resin in sheet form is placed in the stator bore and urged into place by an expansible mandrel or pneumatic device, and the opposed edges joined by fusion or by an adhesive.

In still another form of this invention, the polyester resin in the semi-fluid or plastic state is extruded in place in the stator bore.

This invention possesses many other advantages, and has other objects which may be made more clearly apparent from a consideration of several embodiments of the invention. For this purpose, there are shown a few forms in the drawings accompanying and forming part of the present specification. These forms will now be described in detail, illustrating the general principles of the invention; but it is to be understood that this detailed description is not to be taken in a limiting sense, since the scope of the invention is best defined by the appended claims.

Referring to the drawings:

Fig. 5 is a longitudinal sectional view similar to Fig. 2, showing a further modification in which the liner is urged in place by a pneumatic device, such as an inflatable tube;

Fig. 6 is a longitudinal sectional view of a stator and an extrusion device for forming a tubular plastic liner in the stator bore; and Fig. 7 is a fragmentary transverse sectional view of the lined stator structure shown in Fig. 5.

Figure 1:
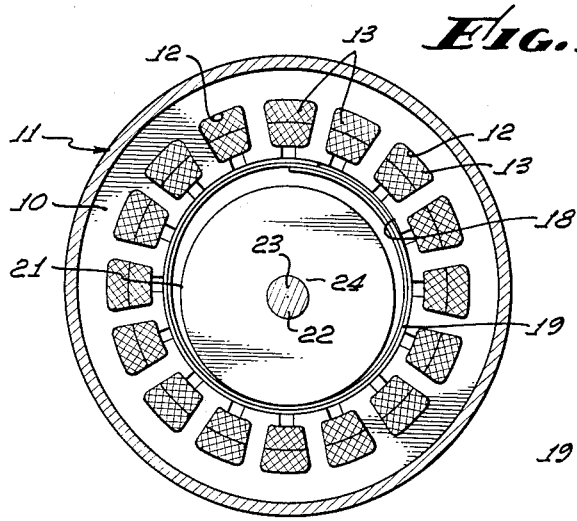
Figure 1 is a transverse sectional view of a stator structure, showing a plastic liner being urged into place in the stator bore by a roller.
Figure 3:
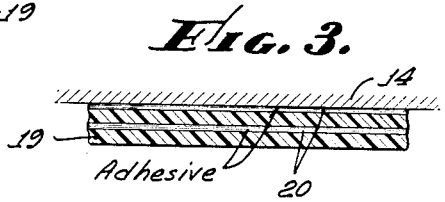
Fig. 3 is an enlarged sectional view of the liner.
Figure 2:
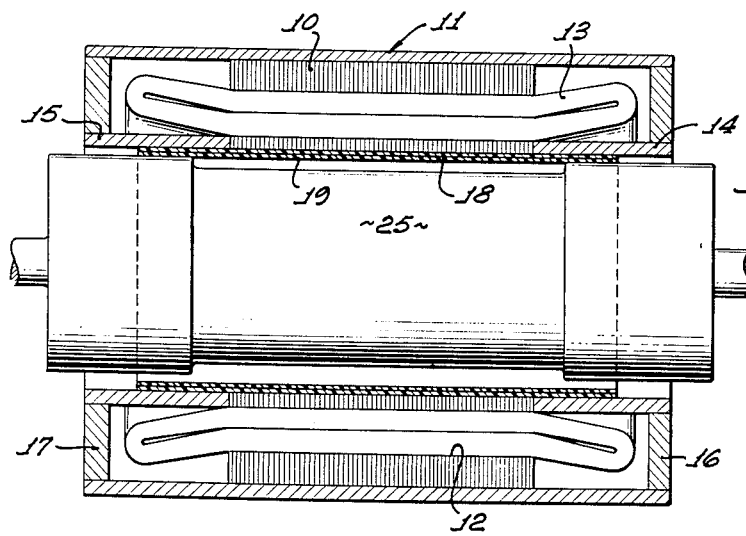
Fig. 2 is a longitudinal sectional view of the stator structure shown in Fig. 1, showing a final placement of the liner by a second roller.

In Figs. 1 and 2 a stack of slotted stator laminations 10 is shown in place in a stator frame 11, windings 13 being provided in the slots 12 of the stator laminations 10. The ends of the windings are enclosed by cylindrical end rings 14 and 15 and end plates 16 and 17. The end rings 14 and 15 extend within the winding ends and abut the opposite end laminations. The inner cylindrical surfaces of the end rings 14 and 15 conform in size to the generally circular inner edges of the stator laminations, the rings 14 and 15 forming the ends of the stator bore 18. Appropriate fastening means (not shown) secure the end rings 14 and 15 and the end plates 16 and 17 to the stator frame 11.

To prevent entry of fluid between the stator laminations, appropriately to protect the windings of the machine, the stator bore is lined by a film or sheet of plastic material. A polyester resin, such as is sold commercially under the trade-name "Mylar" has appropriate properties for use as a liner.

In the form shown in Figs. 1 and 2, plastic material in rectangular sheet form is coated on one side with a suitable cement or adhesive 20. Certain epoxy-resins having thermosetting characteristics are especially suitable for cementing polyester resins and for providing a suitable bond between the polyester resins and metal.

The rectangular sheet has a width exceeding substantially the length of the stacked stator laminations and has a length corresponding at least to twice the circumference of the stator bore. The sheet is convoluted lengthwise with the adhesive layer outermost, the outer turn of the convolutions being slightly smaller than the stator bore. The convoluted sheet is then inserted into the stator bore by appropriate means, and pressed and expanded into place by the aid of rollers to form a liner 19. The thickness of the liner 19 is exaggerated in Figs. 1 and 2. In practice, the sheet material forming the liner may have a thickness of the order of one or two one-hundredths of an inch. The air gap between the rotor and the stator is sufficiently large to leave sufficient clearance for the liner.

Initial placement of the liner 19 is accomplished by a cylindrical roller 21 secured to a shaft 22. The roller 21 is of smaller size than that of the stator bore. A planetary movement to the roller 21 about the axis 23 of the stator bore is imparted thereto, the outer element of the roller engaging the inner turn of the convoluted liner 19. The direction of planetary rotation of the roller 21 is that indicated by the arrow 24. This direction of rotation provides a reaction on the liner directed clockwise as viewed in Fig. 1, corresponding to unwinding movement of the convoluted layers. Engagement of the roller 21 with the inner turn of the convolutions accordingly causes the plastic liner 19 to expand and to move firmly into engagement with the stator bore 18.

In order to speed the initial placement operation and to expedite egress of air bubbles from between the turns of the convoluted plastic, the stator structure within its enclosure may be exhausted.

The adhesive 20 is of such character as to permit at least slight movement of the turns of the plastic liner 19 with respect to each other, the adhesive setting completely only upon its being subjected to an elevated curing temperature.

The final placement operation is achieved by a second or finishing roller 25 shown in Fig. 2. This roller is similar to the roller 21 shown in Fig. 1, but its central portion thereof is relieved so that only the outer ends of the liner 19 beyond the stator laminations are engaged by the roller 25. Seating forces are thus concentrated at the operative ends of the liner.

The use of a plurality of turns effectively ensures a perfect seal.

Plastic material may be injected into the stator slots 12 subsequent to placement of the liner 19 in the stator bore for curing with the adhesive for the plastic liner.

In order to expedite the curing process, the rollers 21 and 25 may be heated, thereby providing a partial curing during the very operation of placement of the plastic liner in the stator bore.

Figure 4:
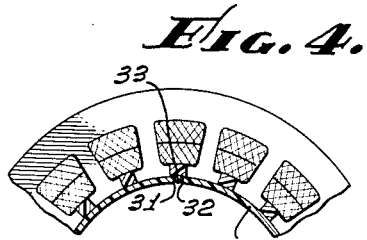
Fig. 4 is a fragmentary transverse sectional view of a stator structure, showing a modified liner construction.

In the form shown in Fig. 4, a plastic liner 30 is coated on one side with adhesive and inserted into the stator bore. In the present instance, the sheet forming the plastic liner 30 is of such size that the end edges 31 and 32 substantially abut each other when in place.

In order to urge the plastic liner 30 in place, a pneumatic or inflatable tubular bag 60 (Fig. 5) may be used. The pneumatic tube or bag in the present instance is sealingly supported about a perforated end 61 of a pipe 62. After the liner 30 is initially placed in the stator bore 18, the pneumatic bag 60, in collapsible condition, is positioned therein. Appropriate air pressure is conducted to the interior of the bag 60 via the pipe 62 and apertures 63 in the pipe end 61 to expand the bag and urge the liner in place.

After the liner 30 has been urged in place by the bag 30, the bag 60 is collapsed and removed.

In order to establish a seal in the opposed edges 31 and 32 of the liner 30, an organic solvent, such as benzol alcohol is applied to the edges. This solvent causes the edges to fuse with each other as at 33. The stator structure is then subjected to curing temperatures.

In the form shown in Figs. 6 and 7, the polyester resin, instead of being coiled and inserted into the stator bore, is extruded in place. To accomplish this purpose, semi-fluid plastic 40 is inserted into a cylinder space 41 of an annular radial extrusion nozzle or head 42. A guide plate 43 secured in spaced relationship to the end of the extrusion head 42 by a series of screws 44, defines a generally circularly shaped space receiving the plastic at it is forced from the cylinder space 41. The plate has an annular edge 45 slightly spaced from the stator bore 46 to define an annular outlet from the extrusion device. In order to apply the plastic, the head 42 is moved downwardly in the direction of the arrow 47 and a piston 48 is moved relative to the cylinder 41 in a direction to cause egress of the semi-fluid plastic material 40.

In order to ensure an appropriate bond, the end rings 49 and 50 of the stator structure may be provided with one or more annular grooves, such as 51 and 52 into which the plastic material may enter.

The entire stator structure may be subjected to an elevated temperature during the extrusion process in order to ensure optimum bonding conditions between the stator structure and the plastic material. After the liner 53 is in place, the stator structure may be subjected to a curing temperature. During such curing operation, the stator may be rotated about its axis so that centrifugal forces prevent sagging.

The inventor claims:

1. The process of forming a watertight seal over the surface of the central bore of the stator structure of a dynamo-electric machine, wherein the stator structure is formed with a plurality of stacked laminations circumscribing said bore, and a housing surrounding and enclosing the exterior of said stacked laminations and including two end structures forming continuations of said bore and terminating contiguously with the two ends of said stacked laminations, comprising extruding an annular layer of a thermosetting plastic material over the surface of said bore by passing an annular radial extrusion nozzle having a diameter only slightly less than the diameter of said bore axially through said bore over the area of said bore defined by said stacked laminations and areas of said bore defined by both of said end structures while extruding said material from said nozzle, heating said material while it is being extruded to facilitate adhesion with the surface of said bore, and rotating said stator structure about the axis of said bore so that centrifugal forces prevent sagging of the extruded layer while curing said extruded layer by heating the same to a thermosetting temperature, whereby a uniform watertight and adherent layer of plastic material is formed over the surface of said bore.

2. The process of forming a watertight seal over the surface of the central bore of the stator structure of a dynamo-electric machine, wherein the stator structure is formed with a plurality of stacked laminations circumscribing said bore, and a housing surrounding and enclosing the exterior of said stacked laminations, comprising extruding an annular layer of a thermosetting plastic material over the surface of said bore by passing an annular radial extrusion nozzle having a diameter only slightly less than the diameter of said bore axially through said bore while extruding said material from said nozzle, heating said material while it is being extruded to facilitate adhesion with the surface of said bore, and rotating said stator structure about the axis of said bore so that centrifugal forces prevent sagging of the extruded layer while curing said extruded layer by heating the same to a thermosetting temperature, whereby a uniform watertight and adherent layer of plastic material is formed over the surface of said bore.

References Cited in the file of this patent

UNITED STATES PATENTS

| | | |
|---|---|---|
| 1,543,502 | Hobart | June 23, 1925 |
| 1,678,380 | Cooper | July 24, 1928 |
| 1,840,027 | Fetter | Jan. 5, 1932 |
| 2,278,858 | Fields | Apr. 7, 1942 |
| 2,400,576 | Sigmund | May 21, 1946 |
| 2,460,831 | Kovacs | Feb. 8, 1949 |
| 2,573,126 | Andrus | Oct. 30, 1951 |
| 2,654,848 | Schaefer | Oct. 6, 1953 |
| 2,659,107 | De Bell | Nov. 17, 1953 |
| 2,777,962 | Maynard | Jan. 15, 1957 |
| 2,783,174 | Stephens | Feb. 26, 1957 |
| 2,785,442 | Boggs | Mar. 19, 1957 |
| 2,798,173 | Penlington | July 2, 1957 |

FOREIGN PATENTS

| | | |
|---|---|---|
| 449,439 | Italy | June 18, 1949 |
| 144,920 | Australia | Feb. 1, 1952 |
| 903,186 | France | Jan. 8, 1945 |
| 912,953 | France | May 20, 1946 |
| 547,821 | Great Britain | Sept. 14, 1942 |
| 742,413 | Great Britain | Dec. 30, 1955 |
| 305,231 | Switzerland | Apr. 16, 1955 |